United States Patent
Kuboyama et al.

(10) Patent No.: US 12,012,013 B2
(45) Date of Patent: Jun. 18, 2024

(54) VEHICLE, VEHICLE CONTROL DEVICE, AND CHARGING SYSTEM

(71) Applicant: TOYOTA JIDOSHA KABUSHIKI KAISHA, Toyota (JP)

(72) Inventors: Yutaka Kuboyama, Toyota (JP); Fumiyoshi Kuribara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 18/100,670

(22) Filed: Jan. 24, 2023

(65) Prior Publication Data

US 2023/0249579 A1 Aug. 10, 2023

(30) Foreign Application Priority Data

Feb. 9, 2022 (JP) ................. 2022-018813

(51) Int. Cl.
| | |
|---|---|
| *B60L 58/12* | (2019.01) |
| *B60L 50/60* | (2019.01) |
| *B60L 53/16* | (2019.01) |
| *B60L 53/18* | (2019.01) |
| *H02J 7/00* | (2006.01) |
| *H02M 3/158* | (2006.01) |

(52) U.S. Cl.
CPC .............. *B60L 58/12* (2019.02); *B60L 50/60* (2019.02); *B60L 53/16* (2019.02); *B60L 53/18* (2019.02); *H02J 7/00032* (2020.01); *H02J 7/00712* (2020.01); *H02M 3/1582* (2013.01); *B60L 2210/12* (2013.01); *B60L 2210/14* (2013.01); *H02J 2207/20* (2020.01)

(58) Field of Classification Search
CPC .......... B60L 58/12; B60L 50/60; B60L 53/16; B60L 53/18; B60L 2210/12; B60L 2210/14; H02J 7/00; H02J 7/00032; H02J 7/00712; H02J 2207/20; H02M 3/1582; H02M 3/158
See application file for complete search history.

(56) References Cited

U.S. PATENT DOCUMENTS

2010/0060080 A1 3/2010 Sawada et al.

FOREIGN PATENT DOCUMENTS

WO 2008/041418 A1 4/2008

*Primary Examiner* — Robert L Deberadinis
(74) *Attorney, Agent, or Firm* — Dinsmore & Shohl LLP

(57) ABSTRACT

A vehicle includes: a first power line configured to connect an inlet and an energy storage device via a power conversion device; a second power line configured to connect the inlet and the energy storage device without via the power conversion device; a first relay configured to switch between a first electrically connected state in which the second power line is electrically connected and a first electrically disconnected state in which the second power line is electrically disconnected; and a first control device. The first control device is configured to switch the first relay to the first electrically disconnected state when a voltage that can be supplied from the external power supply is lower than a voltage range in which the energy storage device can be charged.

8 Claims, 7 Drawing Sheets

VEHICLE, VEHICLE CONTROL DEVICE, AND CHARGING SYSTEM

CROSS-REFERENCE TO RELATED APPLICATION

This application claims priority to Japanese Patent Application No. 2022-018813 filed on Feb. 9, 2022, incorporated herein by reference in its entirety.

BACKGROUND

1. Technical Field

The present disclosure relates to vehicles whose in-vehicle energy storage device can be charged using an external power supply, vehicle control devices, and charging systems.

2. Description of Related Art

In some vehicles such as battery electric vehicles, in-vehicle energy storage devices can be charged using an external power supply. Such vehicles are sometimes equipped with a power conversion device. The power conversion device is, for example, a converter that converts power received from an external power supply to power for charging the in-vehicle energy storage device. The energy storage device can be charged by stepping up or stepping down the voltage of the power from the external power supply using such a power conversion device. Alternatively, the energy storage device can be charged by supplying the power from the external power supply directly to the energy storage device without using a power conversion device.

For example, WO 2008/041418 discloses a vehicle equipped with a plurality of energy storage devices (batteries) and a plurality of boost converters. In this vehicle, at least one of the energy storage devices of the vehicle is charged using the power from an external power supply and at least one of the boost converters.

SUMMARY

The voltage of energy storage devices that are mounted on vehicles has been more and more increased. However, some external power supplies are not compatible with high-voltage energy storage devices. Therefore, vehicles are sometimes equipped with a power conversion device. The power conversion device boosts the voltage from an external power supply when the voltage that can be supplied from the external power supply to the vehicle is not high enough. Therefore, when an external power supply is compatible with high-voltage energy storage devices, the energy storage device can be charged by supplying the power from the external power supply to the energy storage device without via the power conversion device. When an external power supply is not compatible with high-voltage energy storage devices, the energy storage device can be charged by boosting the voltage from the external power supply to a voltage that can charge the energy storage device by the power conversion device and then supplying the resultant power to the energy storage device. Such an operation is implemented by, for example, switching the power transmission path using a switching device such as relay. However, if the relay is switched inappropriately, it may cause an inrush current etc.

The present disclosure provides a vehicle, vehicle control device, and charging system that can appropriately switch to a power transmission path corresponding to the voltage that can be output from an external power supply.

A vehicle according to one aspect of the present disclosure includes: an inlet configured to be connected to an external power supply outside the vehicle; a power conversion device configured to be connected to the inlet; an energy storage device configured to be charged with power supplied via the inlet; a first power line configured to connect the inlet and the energy storage device via the power conversion device; a second power line configured to connect the inlet and the energy storage device without via the power conversion device; a first relay configured to switch between a first electrically connected state in which the second power line is electrically connected and a first electrically disconnected state in which the second power line is electrically disconnected; and a first control device configured to control the first relay. The first control device is configured to switch the first relay to the first electrically disconnected state when a voltage that is able to be supplied from the external power supply is lower than a voltage range in which the energy storage device is able to be charged.

With this configuration, the first relay is in the first electrically disconnected state when the voltage that is able to be supplied from the external power supply is lower than the voltage range in which the energy storage device is able to be charged. Hereinafter, the voltage range in which the energy storage device is able to be charged is sometimes simply referred to as "voltage range." A current can thus be restrained from flowing from the energy storage device to the external power supply. Therefore, it is possible to appropriately switch to the power transmission path corresponding to the voltage that is able to be output from the external power supply.

In one embodiment, the vehicle may further include a second control device different from the first control device. The second control device may be configured to acquire information on the voltage that is able to be supplied from the external power supply, and may be configured to, when the voltage that is able to be supplied from the external power supply as included in the acquired information is lower than the voltage range, switch the first relay to the first electrically disconnected state regardless of a command for the first relay generated in the first control device.

With this configuration, the first relay to be in the first electrically disconnected state even when a normal command signal cannot be generated in the first control device.

In one embodiment, the vehicle may further include a second relay configured to switch between a second electrically connected state in which the first power line is electrically connected and a second electrically disconnected state in which the first power line is electrically disconnected. The first control device may be configured to switch the first relay to the first electrically connected state and switch the second relay to the second electrically disconnected state when the voltage that is able to be supplied from the external power supply is within the voltage range.

With this configuration, the first relay is in the first electrically connected state and the second relay is in the second electrically disconnected state when the voltage that is able to be supplied from the external power supply is within the voltage range. Therefore, it is possible to charge the energy storage device by supplying the power supplied to the inlet directly to the energy storage device without via the power conversion device.

In one embodiment, the vehicle may further include a detection device that detects a voltage at the inlet. The second control device may be configured to, when the voltage that is able to be supplied from the external power supply is lower than the voltage range and the voltage at the inlet is higher than a threshold, switch the first relay to the first electrically disconnected state and the second relay to the second electrically disconnected state regardless of a command for the first relay and the second relay generated in the first control device.

With this configuration, when the voltage that is able to be supplied from the external power supply is lower than the voltage range and the voltage at the inlet is higher than the threshold, the first relay is in the first electrically disconnected state and the second relay is in the second electrically disconnected state regardless of a command for the first relay and the second relay generated in the first control device. A current can thus be restrained from flowing from the vehicle side to the external power supply side.

A vehicle control device according to another aspect of the present disclosure is mounted on a vehicle. The vehicle includes: an inlet configured to be connected to an external power supply outside the vehicle; a power conversion device configured to be connected to the inlet; an energy storage device configured to be charged with power supplied via the inlet; a first power line configured to connect the inlet and the energy storage device via the power conversion device; a second power line configured to connect the inlet and the energy storage device without via the power conversion device; and a first relay configured to switch between a first electrically connected state in which the second power line is electrically connected and a second electrically disconnected state in which the second power line is electrically disconnected. The vehicle control device includes: an acquisition unit configured to acquire a voltage that is able to be supplied from the external power supply; and a control unit configured to control the first relay in such a manner that the first relay switches to the first electrically disconnected state when the voltage that is able to be supplied from the external power supply is lower than a voltage range in which the energy storage device is able to be charged.

A charging system according to still another aspect of the present disclosure includes a vehicle, and an external power supply outside the vehicle. The vehicle includes: an inlet configured to be connected to the external power supply; a power conversion device configured to be connected to the inlet; an energy storage device configured to be charged with power supplied via the inlet; a first power line configured to connect the inlet and the energy storage device via the power conversion device; a second power line configured to connect the inlet and the energy storage device without via the power conversion device; and a first relay configured to switch between a first electrically connected state in which the second power line is electrically connected and a first electrically disconnected state in which the second power line is electrically disconnected. The external power supply includes a control device configured to control the first relay. The control device is configured to switch the first relay to the first electrically disconnected state when a voltage that is able to be supplied from the external power supply is lower than a voltage range in which the energy storage device is able to be charged.

According to the present disclosure, it is possible to provide a vehicle, vehicle control device, and charging system that appropriately switch to a power transmission path corresponding to the voltage that can be output from an external power supply.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. The same or corresponding parts are denoted by the same signs throughout the drawings, and description thereof will not be repeated.

Figure 1:
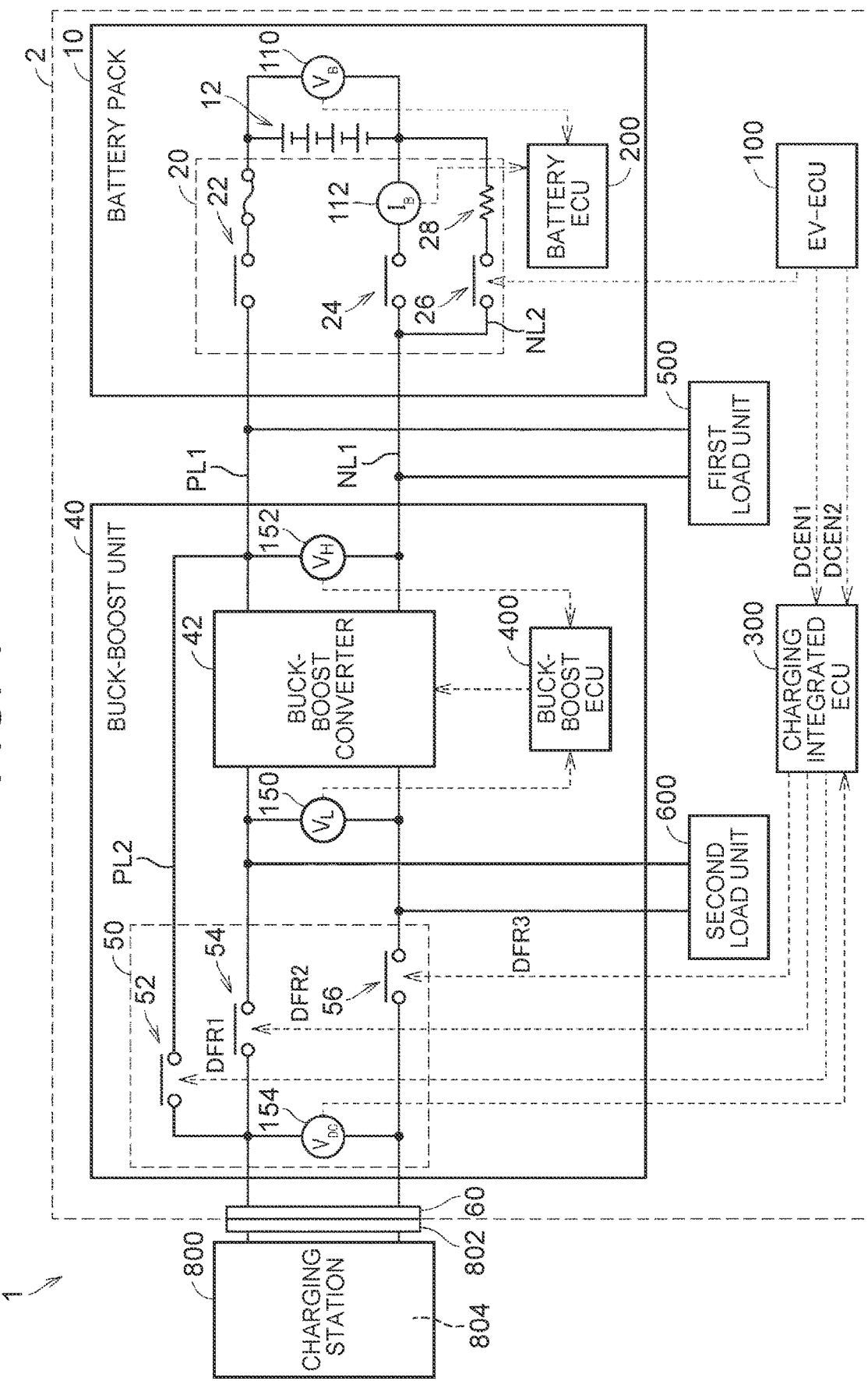
FIG. 1 schematically shows an example of a configuration of a charging system according to an embodiment.

FIG. 1 schematically shows an example of a configuration of a charging system 1 according to an embodiment. Referring to FIG. 1, the charging system 1 includes a vehicle 2 and a charging station 800. The vehicle 2 includes a battery pack 10, a buck-boost unit 40, an inlet 60, an electric vehicle-electronic control unit (EV-ECU) 100, a charging integrated ECU 300, a first load unit 500, and a second load unit 600. The vehicle 2 is, for example, an electrified vehicle such as battery electric vehicle or hybrid electric vehicle.

The battery pack 10 includes an energy storage device 12, a system main relay (SMR) unit 20, a battery ECU 200, a battery voltage sensor 110, and a battery current sensor 112.

The EV-ECU 100 includes a processor such as central processing unit (CPU), a memory such as read-only memory (ROM) and random access memory (RAM), and an input and output port for inputting and outputting various signals (none of which is shown). The EV-ECU 100 manages the operating state of an in-vehicle electrical device such as SMR unit 20, based on signals from various sensors and programs stored in the memory. The EV-ECU 100 outputs, for example, a permission-prohibition signal DCEN1 to the charging integrated ECU 300. The permission-prohibition signal DCEN1 indicates whether the operation of a first relay 52 according to a first command for the first relay 52 generated in the charging integrated ECU 300 is permitted or prohibited. The EV-ECU 100 also outputs, for example, a permission-prohibition signal DCEN2 to the charging integrated ECU 300. The permission-prohibition signal DCEN2 indicates whether the operation of a second relay 54 and a third relay 56 according to a second command for the second relay 54 and a third command for the third relay 56 generated in the charging integrated ECU 300 is permitted or prohibited.

The energy storage device 12 is a rechargeable direct current (DC) power supply. The energy storage device 12 includes, for example, a secondary battery such as nickel metal hydride battery or lithium-ion battery with a liquid or solid electrolyte. The energy storage device 12 may be a capacitor such as electric double layer capacitor. The energy storage device 12 supplies power to an electrical device included in the first load unit 500. The energy storage device 12 may be charged with the power supplied from the buck-boost unit 40 or the first load unit 500. The energy storage device 12 is, for example, an assembled battery composed of a plurality of battery cells. In the present embodiment, the energy storage device 12 includes, for example, an energy storage device having a voltage higher than 500 V.

The SMR unit 20 is electrically connected between the energy storage device 12 and the buck-boost unit 40 and first load unit 500. Commands to close and open the SMR unit 20 are send from the EV-ECU 100. The SMR unit 20 includes, for example, a first SMR 22, a second SMR 24, a third SMR 26, and a precharge resistor 28. The commands to close and open the SMR unit 20 include commands to close and open the first SMR 22, commands to close and open the second SMR 24, and commands to close and open the third SMR 26.

The first SMR 22 is provided on a first positive electrode line PL1. The first positive electrode line PL1 includes a power line connecting a positive terminal of the inlet 60 and a positive terminal of the energy storage device 12. The second SMR 24 is provided on a first negative electrode line NL1. The first negative electrode line NL1 includes a power line connecting a negative terminal of the inlet 60 and a negative terminal of the energy storage device 12. The third SMR 26 is provided on a second negative electrode line NL2. The second negative electrode line NL2 is connected in parallel with the second SMR 24 provided on the first negative electrode line NL1. The precharge resistor 28 is connected in series with the third SMR 26 on the second negative electrode line NL2.

The battery ECU 200 includes a processor such as CPU, a memory such as ROM and RAM, and an input and output port for inputting and outputting various signals (none of which is shown). The battery ECU 200 manages the charge state of the energy storage device 12, based on signals received from the battery voltage sensor 110 and the battery current sensor 112 and programs stored in the memory.

The battery voltage sensor 110 detects a battery voltage VB of the energy storage device 12 and sends a signal indicating the detected battery voltage VB to the battery ECU 200. The battery voltage sensor 110 is provided in parallel with the energy storage device 12 between, for example, the first positive electrode line PL1 and the first negative electrode line NL1. The battery voltage sensor 110 detects the voltage between the first positive electrode line PL1 and the first negative electrode line NL1 as the battery voltage VB.

The battery current sensor 112 detects a battery current IB flowing through the energy storage device 12 and sends a signal indicating the detected battery current D3 to the battery ECU 200. The battery current sensor 112 is connected in series with the second SMR 24, and detects a current flowing through the energy storage device 12 as the battery current IB.

The battery ECU 200 calculates the state of charge (SOC) of the energy storage device 12 using the battery current IB and the battery voltage VB. Various methods such as current integration (Coulomb counting) method and open-circuit voltage (OCV) estimation method can be used to calculate the SOC. The battery ECU 200 sends information on the calculated SOC to the EV-ECU 100 and the charging integrated ECU 300.

The first load unit 500 includes an electrical device that operates at a predetermined first voltage (e.g., a voltage higher than 500 V). The first load unit 500 includes, for example, a power control unit (PCU) and a motor generator (MG) (neither of which is shown). The PCU converts power between the battery pack 10 and the MG. The PCU includes, for example, an inverter that drives the MG with the power supplied from the battery pack 10, and a converter that adjusts the level of a direct current (DC) voltage to be supplied to the inverter (neither of which is shown).

For example, the MG is driven by the inverter of the PCU when the vehicle 2 is traveling. The power of the MG is transmitted to drive wheels.

The inlet 60 is provided in an exterior portion of the vehicle 2. The buck-boost unit 40 is connected to the inlet 60. For example, the buck-boost unit 40 steps up or steps down the voltage of the power supplied to the inlet 60 and supplies the power with the resultant voltage to the first load unit 500 and the second load unit 600.

The inlet 60 has such a shape that a connector 802 of the charging station 800 that is an external power supply can be attached to the inlet 60. When the connector 802 is attached to the inlet 60, a built-in contact of the inlet 60 comes into contact with a built-in contact of the connector 802, so that the inlet 60 is electrically connected to the connector 802. The connector 802 is connected to the charging station 800 via a cable etc. FIG. 1 shows, by way of example, the connector 802 attached to the inlet 60.

The charging station 800 is, for example, a charging station that can perform charging with an upper limit of the charging voltage being 500 V or less.

The buck-boost unit 40 includes a buck-boost converter 42, a charging relay unit 50, a first voltage sensor 150, a second voltage sensor 152, a third voltage sensor 154, and a buck-boost ECU 400.

The buck-boost converter 42 boosts the voltage of the power supplied from the charging station 800 and supplies the resultant power to the battery pack 10 and the first load unit 500, according to a control signal from the buck-boost ECU 400. The second load unit 600 is connected to power lines branching from the first positive electrode line PL1 and the first negative electrode line NL1 between the buck-boost converter 42 and the charging relay unit 50. For example, the power supplied from the charging station 800 may be supplied directly to the second load unit 600 via the inlet 60 and the charging relay unit 50. The second load unit 600 includes, for example, an electrical device (e.g., PCU and MG) that operates at a predetermined second voltage (e.g., voltage of 500 V or less).

The buck-boost ECU 400 includes a processor such as CPU, a memory such as ROM and RAM, and an input and output port for inputting and outputting various signals (none of which is shown). The buck-boost ECU 400 controls the buck-boost converter 42 based on signals received from the first voltage sensor 150 and the second voltage sensor 152 and programs stored in the memory.

The first voltage sensor 150 detects a voltage VL to be input to the buck-boost converter 42 (i.e., a voltage between the first positive electrode line PL1 and the first negative electrode line NL1 between the charging relay unit 50 and the buck-boost converter 42), and sends a signal indicating the detected voltage VL to the buck-boost ECU 400.

The second voltage sensor 152 detects a voltage VH output from the buck-boost converter 42 (i.e., a voltage between the first positive electrode line PL1 and the first negative electrode line NL1 between the buck-boost converter 42 and the battery pack 10), and sends a signal indicating the detected voltage VH to the buck-boost ECU 400.

The charging relay unit 50 is electrically connected between the inlet 60 and the buck-boost converter 42. Commands to close and open the charging relay unit 50 are sent from the charging integrated ECU 300. The charging relay unit 50 includes the first relay 52, the second relay 54, and the third relay 56.

The first relay 52 is provided on a second positive electrode line PL2. One end of the second positive electrode line PL2 is connected to a position between the inlet 60 and the second relay 54 that will be described below on the first positive electrode line PL1. The other end of the second positive electrode line PL2 is connected to a position between the buck-boost converter 42 and the battery pack 10 on the first positive electrode line PL1. The second relay 54 is provided at a position between the inlet 60 and the buck-boost converter 42 on the first positive electrode line PL1. The third relay 56 is provided at a position between the inlet 60 and the buck-boost converter 42 on the first negative electrode line NL1.

Each of the first relay 52, the second relay 54, and the third relay 56 operates according to a control signal from the charging integrated ECU 300. That is, the commands to close and open the charging relay unit 50 include commands to close and open the first relay 52, commands to close and open the second relay 54, and commands to close and open the third relay 56.

The charging integrated ECU 300 includes: a microcomputer composed of a processor such as CPU, a memory such as ROM and RAM, and an input and output port for inputting and outputting various signals; and a plurality of logic circuits that outputs drive signals for the first relay 52, the second relay 54, and the third relay 56 using signals output from the microcomputer and signals input from the EV-ECU 100. The microcomputer and the logic circuits will be described later.

When the connector 802 is attached to the inlet 60, the charging integrated ECU 300 controls at least one of the three relays, the first relay 52, the second relay 54, and the third relay 56, based on information indicating whether the connector 802 is attached to the inlet 60, information on the power supplied from the charging station 800 that is acquired from the charging station 800, signals received from the third voltage sensor 154, and programs stored in the memory.

The third voltage sensor 154 detects a voltage VDC between a connection point of the first positive electrode line PL1 with the one end of the second positive electrode line PL2 and the first negative electrode line NL1. The third voltage sensor 154 sends a signal indicating the detected voltage VDC to the charging integrated ECU 300.

For example, the inlet 60 is provided with a detection circuit or detection sensor (not shown) that detects whether the connector 802 is attached to the inlet 60. When the connector 802 is attached to the inlet 60, the detection circuit or detection sensor outputs a signal indicating that the connector 802 is attached to the inlet 60 to the charging integrated ECU 300. The charging integrated ECU 300 determines that the connector 802 is attached to the inlet 60, when this signal is input to the charging integrated ECU 300 as the information indicating whether the connector 802 is attached to the inlet 60.

The charging integrated ECU 300 also controls at least one of the three relays, the first relay 52, the second relay 54, and the third relay 56, using the information on the power supplied from the charging station 800. For example, the charging integrated ECU 300 may acquire the information on the power supplied from the charging station 800 by wireless communication with the charging station 800, or may acquire the information on the power supplied from the charging station 800 by wired communication using a power line and a communication line.

The voltage of the energy storage device 12 that is mounted on the vehicle 2 with the above configuration has been more and more increased. However, the charging station 800 may not be compatible with such high-voltage energy storage devices. Therefore, the vehicle 2 is equipped with such a buck-boost converter 42 as described above. When the charging station 800 is compatible with high-voltage energy storage devices, the energy storage device 12 can be charged by supplying power from the charging station 800 to the energy storage device 12 without via the buck-boost converter 42. When the charging station 800 is not compatible with high-voltage energy storage devices, the energy storage device 12 can be charged by boosting the voltage from the charging station 800 to a voltage that can charge the energy storage device 12 by the buck-boost converter 42 and supplying the resultant power to the energy storage device 12. Such an operation is implemented by switching the power transmission path using the above charging relay unit 50. However, if the relay is switched inappropriately, it may cause an inrush current etc.

Therefore, in the present embodiment, when the voltage supplied from the charging station 800 is lower than the voltage range in which the energy storage device 12 can be charged, the charging integrated ECU 300 opens the first relay 52 to electrically disconnect the second positive electrode line PL2 (a first electrically disconnected state).

A current can thus be restrained from flowing from the energy storage device 12 to the charging station 800. Therefore, it is possible to appropriately switch to the power transmission path corresponding to the voltage that can be output from the charging station 800.

Moreover, when the voltage that can be supplied from the charging station 800 as included in information on the voltage that can be supplied from the charging station 800 is lower than the voltage range, the EV-ECU 100 electrically disconnects the first relay 52 (the first electrically disconnected state) regardless of the command for the first relay 52 generated in the charging integrated ECU 300.

The first relay 52 can thus be electrically disconnected even when a normal command signal cannot be generated in the charging integrated ECU 300.

Figure 2:
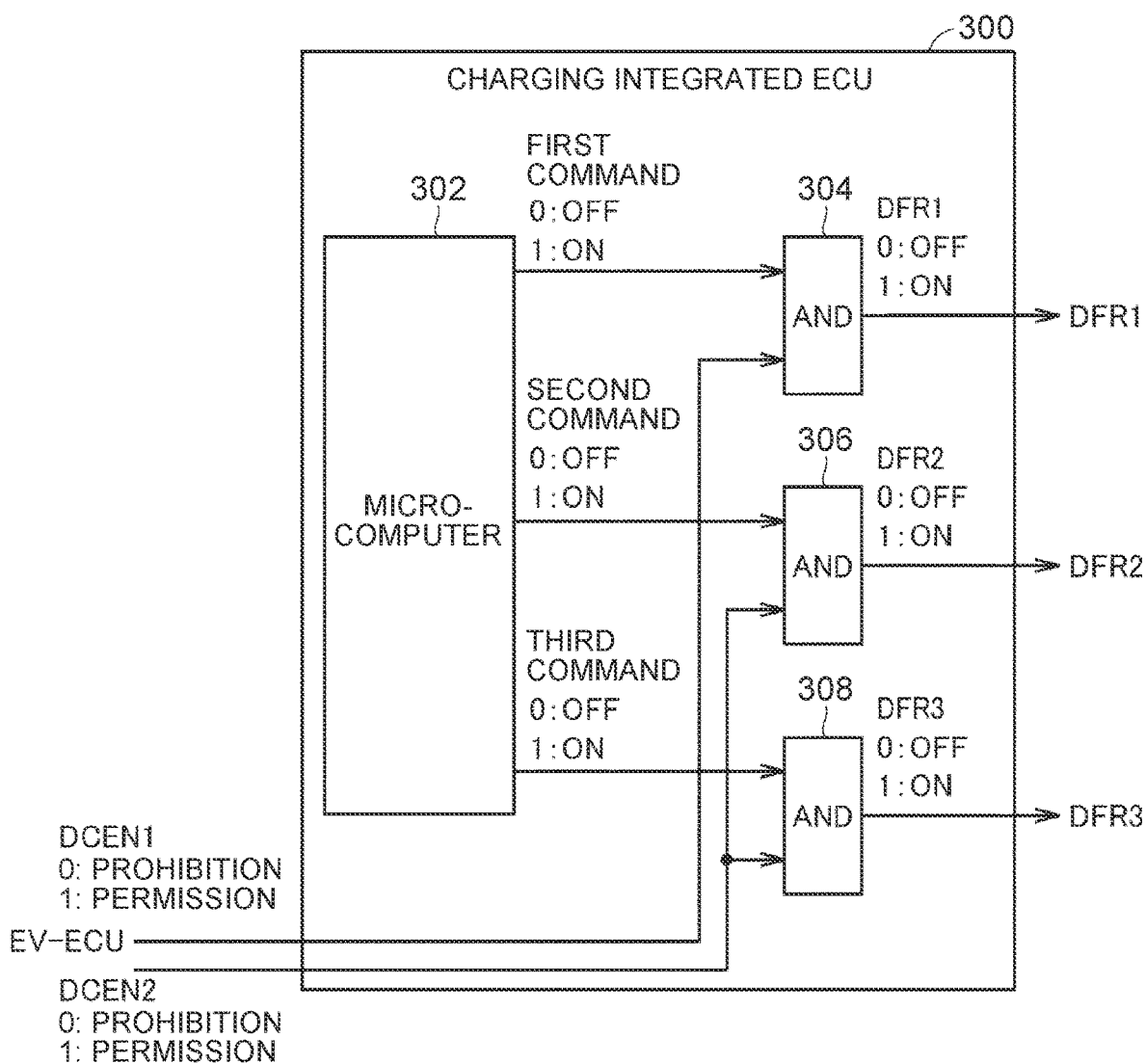
FIG. 2 shows an example of a detailed configuration of a charging integrated electronic control unit (charging integrated ECU)

Hereinafter, a detailed configuration of the charging integrated ECU 300 will be described with reference to FIG. 2. FIG. 2 shows an example of a detailed configuration of the charging integrated ECU 300.

As shown in FIG. 2, the charging integrated ECU 300 includes a microcomputer 302, a first logical conjunction (AND) circuit 304, a second AND circuit 306, and a third AND circuit 308.

The microcomputer 302 outputs a first command for the first relay 52 to the first AND circuit 304. The microcomputer 302 also outputs a second command for the second relay 54 to the second AND circuit 306. The microcomputer 302 also outputs a third command for the third relay 56 to the third AND circuit 308. Each of the first command, the second command, and the third command includes, for example, either an OFF signal for outputting "0" corresponding to a command to switch to the electrically disconnected state or an ON signal for outputting "1" corresponding to a command to switch to the electrically connected state.

The microcomputer 302 determines the state (either the electrically connected state or the electrically disconnected state) of each of the first relay 52, the second relay 54, and the third relay 56, based on the information on the voltage that can be supplied from the charging station 800.

The microcomputer 302 outputs, as a command signal, a signal indicating an ON state (e.g., "1") to a logic circuit corresponding to a relay to be electrically connected (hereinafter referred to as "relay to be rendered conductive"). The microcomputer 302 outputs, as a command signal, a signal indicating an OFF state (e.g., "0") to a logic circuit corresponding to a relay to be electrically disconnected (hereinafter referred to as "relay to be rendered non-conductive").

For example, when the microcomputer 302 determines the first relay 52 to be a relay to be rendered conductive and determines the second relay 54 and the third relay 56 to be relays to be rendered non-conductive, the microcomputer 302 outputs an ON signal to the first AND circuit 304 and outputs an OFF signal to each of the second AND circuit 306 and the third AND circuit 308.

For example, when the microcomputer 302 determines the first relay 52 to be a relay to be rendered non-conductive and determines the second relay 54 and the third relay 56 to be relays to be rendered conductive, the microcomputer 302 outputs an OFF signal to the first AND circuit 304 and outputs an ON signal to each of the second AND circuit 306 and the third AND circuit 308.

Not only the first command but also the permission-prohibition signal DCEN1 from the EV-ECU 100 are input to the first AND circuit 304. Not only the second command but also the permission-prohibition signal DCEN2 from the EV-ECU 100 are input to the second AND circuit 306. Not only the third command but also the permission-prohibition signal DCEN2 from the EV-ECU 100 are input to the third AND circuit 308.

The first AND circuit 304 outputs to the first relay 52 a drive signal DFR1 generated using the first command from the microcomputer 302 and the permission-prohibition signal DCEN1 from the EV-ECU 100.

Specifically, the first AND circuit 304 outputs a signal corresponding to a logical conjunction of the first command from the microcomputer 302 and the permission-prohibition signal DCEN1 from the EV-ECU 100 to the first relay 52 as the drive signal DFR1.

For example, when the permission-prohibition signal DCEN1 is a signal indicating permission (e.g., a signal corresponding to "1"), the first AND circuit 304 outputs the first command from the microcomputer 302 to the first relay 52 as the drive signal DFR1. That is, when an ON signal is output from the microcomputer 302 as the first command, an ON signal is output from the first AND circuit 304 to the first relay 52 as the drive signal DFR1. When an OFF signal is output from the microcomputer 302 as the first command, an OFF signal is output from the first AND circuit 304 to the first relay 52 as the drive signal DFR1.

On the other hand, for example, when the permission-prohibition signal DCEN1 is a signal indicating prohibition (e.g., a signal corresponding to "0"), an OFF signal is output from the first AND circuit 304 to the first relay 52 as the drive signal DFR1 regardless of whether the first command from the microcomputer 302 is an ON signal or an OFF signal.

The second AND circuit 306 outputs to the second relay 54 a drive signal DFR2 generated using the second command from the microcomputer 302 and the permission-prohibition signal DCEN2 from the EV-ECU 100.

Specifically, the second AND circuit 306 outputs a signal corresponding to a logical conjunction of the second command from the microcomputer 302 and the permission-prohibition signal DCEN2 from the EV-ECU 100 to the second relay 54 as the drive signal DFR2.

For example, when the permission-prohibition signal DCEN2 is a signal indicating permission (e.g., a signal corresponding to "1"), the second AND circuit 306 outputs the second command from the microcomputer 302 to the second relay 54 as the drive signal DFR2. That is, when an ON signal is output from the microcomputer 302 as the second command, an ON signal is output from the second AND circuit 306 to the second relay 54 as the drive signal DFR2.

On the other hand, for example, when the permission-prohibition signal DCEN2 is a signal indicating prohibition (e.g., a signal corresponding to "0"), an OFF signal is output from the second AND circuit 306 to the second relay 54 as the drive signal DFR2 regardless of whether the second command from the microcomputer 302 is an ON signal or an OFF signal.

The third AND circuit 308 outputs to the third relay 56 a drive signal DFR3 generated using the third command from the microcomputer 302 and the permission-prohibition signal DCEN2 from the EV-ECU 100.

Specifically, the third AND circuit 308 outputs a signal corresponding to a logical conjunction of the third command from the microcomputer 302 and the permission-prohibition signal DCEN2 from the EV-ECU 100 to the third relay 56 as the drive signal DFR3.

The operation of the third AND circuit 308 is different from the operation of the second AND circuit 306 illustrated above in that the third command is input to the third AND circuit 308 instead of the second command and that the drive signal DFR3 is output from the third AND circuit 308 instead of the drive signal DFR2. Since the configuration and operation of the third AND circuit 308 are otherwise similar to those of the second AND circuit 306, detailed description thereof will not be repeated.

For example, when the connector 802 is attached to the inlet 60, the microcomputer 302 determines a relay to be rendered conductive and a relay to be rendered non-conductive by using the information on the voltage that can be supplied from the charging station 800.

For example, when the voltage that can be supplied from the charging station 800 is a voltage within the voltage range in which the energy storage device 12 can be charged, the microcomputer 302 determines the first relay 52 and the third relay 56 to be relays to be rendered conductive and determines the second relay 54 to be a relay to be rendered non-conductive. Therefore, the microcomputer 302 outputs an ON signal to the first AND circuit 304 and the third AND circuit 308 as the first command and the third command, respectively, and outputs an OFF signal to the second AND circuit 306 as the second command.

On the other hand, for example, when the voltage that can be supplied from the charging station 800 is a voltage lower than the voltage range in which the energy storage device 12 can be charged, the microcomputer 302 determines the second relay 54 and the third relay 56 to be relays to be rendered conductive and determines the first relay 52 to be a relay to be rendered non-conductive. Therefore, the microcomputer 302 outputs an ON signal to the second AND circuit 306 and the third AND circuit 308 as the second command and the third command, respectively, and outputs an OFF signal to the first AND circuit 304 as the first command.

For example, when the SOC of the energy storage device 12 acquired from the battery ECU 200 is within a range corresponding to the fully charged state, the microcomputer 302 outputs an OFF signal to the first AND circuit 304, the second AND circuit 306, and the third AND circuit 308 as the first command, the second command, and the third command, respectively.

In the present embodiment, as described above, the EV-ECU 100 in the vehicle 2 having the above configuration outputs an OFF signal as the permission-prohibition signal DCEN1 when the voltage that can be supplied from the charging station 800 is lower than the voltage range in which the energy storage device 12 can be charged.

Figure 3:
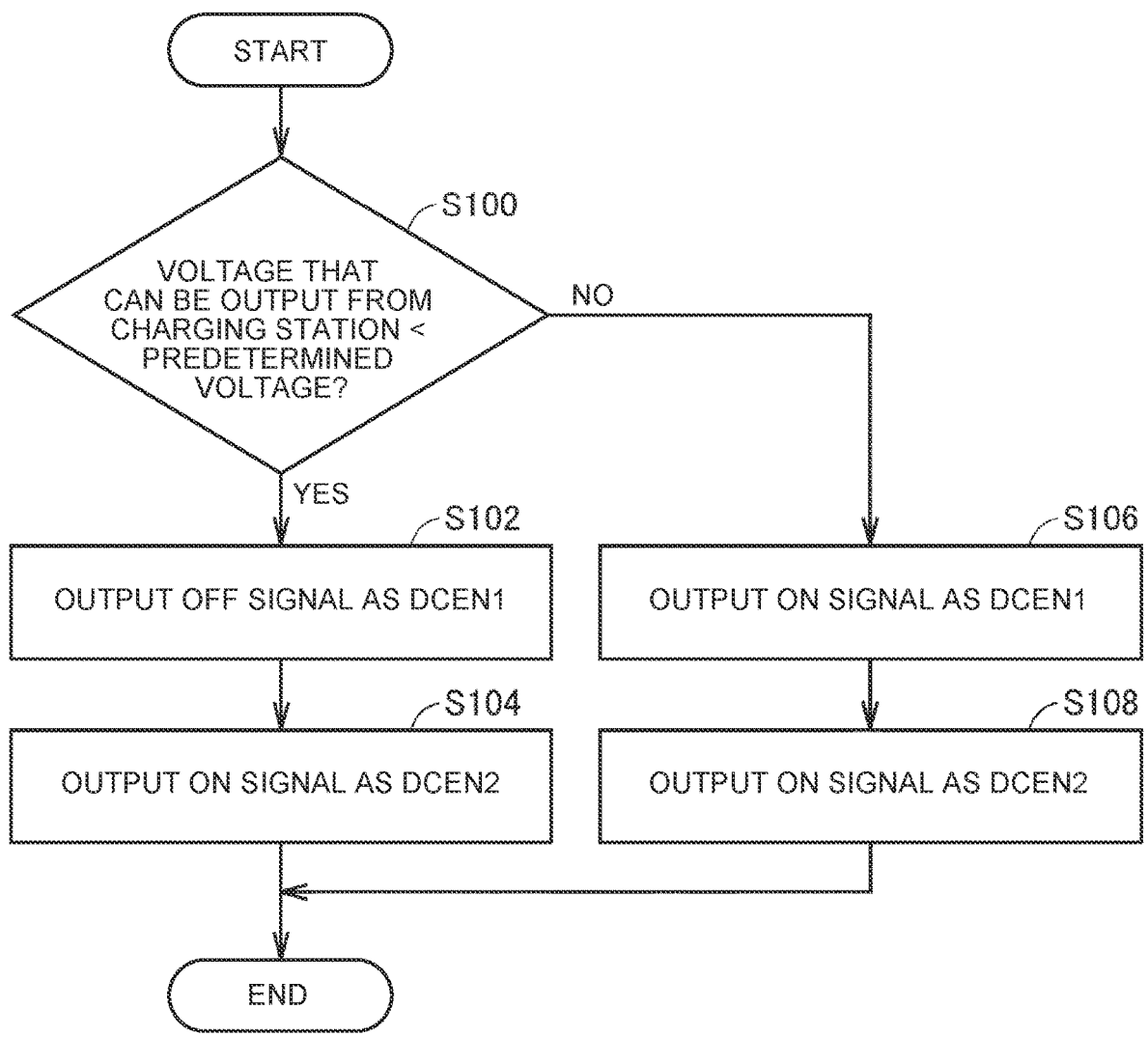
FIG. 3 is a flowchart showing an example of a process that is performed by an electric vehicle electronic control unit (EV-ECU)

Hereinafter, an example of a process that is performed by the EV-ECU 100 will be described with reference to FIG. 3. FIG. 3 is a flowchart showing an example of a process that is performed by the EV-ECU 100. A series of steps shown in the flowchart is repeatedly performed by the EV-ECU 100 in predetermined control cycles.

In step 100 (hereinafter the term "step" is abbreviated as "S"), the EV-ECU 100 determines whether the voltage that can be output from the charging station 800 is lower than a predetermined voltage. The EV-ECU 100 determines whether the voltage that can be output from the charging station 800 is lower than the predetermined voltage by using, for example, information on charging power acquired from the charging station 800. Since the method for acquiring the information on charging power is as described above, detailed description thereof will not be repeated. The predetermined voltage is, for example, a voltage of about 500 V. When it is determined that the voltage that can be output from the charging station 800 is lower than the predetermined voltage (YES in S100), the process proceeds to S102.

In S102, the EV-ECU 100 outputs an OFF signal as the permission-prohibition signal DCEN1. The process then proceeds to S104.

In S104, the EV-ECU 100 outputs an ON signal as the permission-prohibition signal DCEN2. The process then ends. When it is determined that the voltage that can be output from the charging station 800 is equal to or higher than the predetermined voltage (NO in S100), the process proceeds to S106.

In S106, the EV-ECU 100 outputs an ON signal as the permission-prohibition signal DCEN1. The process then proceeds to S108.

In S108, the EV-ECU 100 outputs an ON signal as the permission-prohibition signal DCEN2. The process then ends.

An example of the operation of the EV-ECU 100 and the charging integrated ECU 300 according to the present embodiment based on the above structure and flowchart will be described.

For example, it is herein assumed that the connector 802 of the charging station 800 is attached to the inlet 60 of the vehicle 2 in a stopped state. It is also assumed that the upper limit of the voltage that can be output from the charging station 800 is lower than the predetermined voltage.

When the connector 802 of the charging station 800 is attached to the inlet 60, information on charging power is acquired from the charging station 800, and it is determined whether the voltage that can be output from the charging station 800 as included in the acquired information is lower than the predetermined voltage (S100).

When the voltage that can be output from the charging station 800 is lower than the predetermined voltage (YES in S100), an OFF signal is output to the charging integrated ECU 300 as the permission-prohibition signal DCEN1 (S102), and an ON signal is output to the charging integrated ECU 300 as the permission-prohibition signal DCEN2 (S104).

For example, when the connector 802 is attached to the inlet 60 and the voltage that can be output from the charging station 800 is lower than the predetermined voltage, the microcomputer 302 of the charging integrated ECU 300 determines the second relay 54 and the third relay 56 to be relays to be rendered conductive, and determines the first relay 52 to be a relay to be rendered non-conductive. Therefore, the microcomputer 302 outputs an ON signal to the second AND circuit 306 and the third AND circuit 308 as the second command and the third command, respectively, and outputs an OFF signal to the first AND circuit 304 as the first command.

When an ON signal is input from the EV-ECU 100 to the second AND circuit 306 and the third AND circuit 308 as the permission-prohibition signal DCEN2, an ON signal is output from the second AND circuit 306 and the third AND circuit 308 to the second relay 54 and the third relay 56 as the drive signals DFR2, DFR3, respectively, and an OFF signal is output from the first AND circuit 304 to the first relay 52 as the drive signal DFR1. At this time, the second positive electrode line PL2 is electrically disconnected, and the first positive electrode line PL1 is electrically connected. Therefore, the power from the charging station 800 is supplied to the energy storage device 12 via the buck-boost converter 42.

An OFF signal is input from the EV-ECU 100 to the first AND circuit 304 as the permission-prohibition signal DCEN1. Therefore, even when an ON signal is input to the first AND circuit 304 as the first command due to an abnormality in the microcomputer 302, an OFF signal is output from the first AND circuit 304 as the drive signal DFR1. Therefore, the first relay 52 is suppressed from being in an electrically connected state (a first electrically connected state).

When the voltage that can be output from the charging station 800 is equal to or higher than the predetermined voltage (NO in S100), an ON signal is output to the charging integrated ECU 300 as the permission-prohibition signal DCEN1 (S106), and an ON signal is output to the charging integrated ECU 300 as the permission-prohibition signal DCEN2 (S108).

For example, when the connector 802 is attached to the inlet 60 and the voltage that can be output from the charging station 800 is equal to or higher than the predetermined voltage, the microcomputer 302 of the charging integrated ECU 300 determines the first relay 52 and the third relay 56 to be relays to be rendered conductive, and determines the second relay 54 to be a relay to be rendered non-conductive. Therefore, the microcomputer 302 outputs an ON signal to the first AND circuit 304 and the third AND circuit 308 as the first command and the third command, respectively, and outputs an OFF signal to the second AND circuit 306 as the second command.

When an ON signal is input from the EV-ECU 100 to the first AND circuit 304 as the permission-prohibition signal DCEN1 and an ON signal is input from the EV-ECU 100 to the second AND circuit 306 and the third AND circuit 308 as the permission-prohibition signal DCEN2, an ON signal is output from the first AND circuit 304 and the third AND circuit 308 to the first relay 52 and the third relay 56 as the drive signals DFR1, DFR3, respectively, and an OFF signal is output from the second AND circuit 306 to the second relay 54 as the drive signal DFR2. At this time, the second positive electrode line PL2 is electrically connected, and the connection point of the first positive electrode line PL1 with the one end of the second positive electrode line PL2 is electrically disconnected from a connection point of the first positive electrode line PL1 with the other end of the second positive electrode line PL2. Therefore, the power from the charging station 800 is supplied to the energy storage device 12 without via the buck-boost converter 42.

As described above, in the vehicle 2 according to the present embodiment, when the voltage that can be supplied from the charging station 800 that is an external power supply is lower than the voltage range in which the energy storage device 12 can be charged, the first relay 52 is electrically disconnected. A current can therefore be restrained from flowing from the energy storage device 12 to the charging station 800. In particular, an OFF signal is input to the first AND circuit 304 as the permission-prohibition signal DCEN1. Therefore, even when an ON signal is input to the first AND circuit 304 as the first command due to an abnormality in the microcomputer 302, an OFF signal is output from the first AND circuit 304. Therefore, the first relay 52 can be electrically disconnected. Accordingly, it is possible to provide a vehicle, vehicle control device, and charging system that appropriately switch to a power transmission path corresponding to the voltage that can be output from an external power supply.

Hereinafter, modifications will be described. In the above embodiment, it is described that the permission-prohibition signals DCEN1, DCEN2 are set based on whether the voltage that can be output from the charging station 800 is lower than the predetermined voltage. For example, the permission-prohibition signals DCEN1, DCEN2 may be set based not only on the voltage that can be output from the charging station 800 but also on whether the voltage VDC detected by the third voltage sensor 154 is higher than a threshold.

Figure 4:
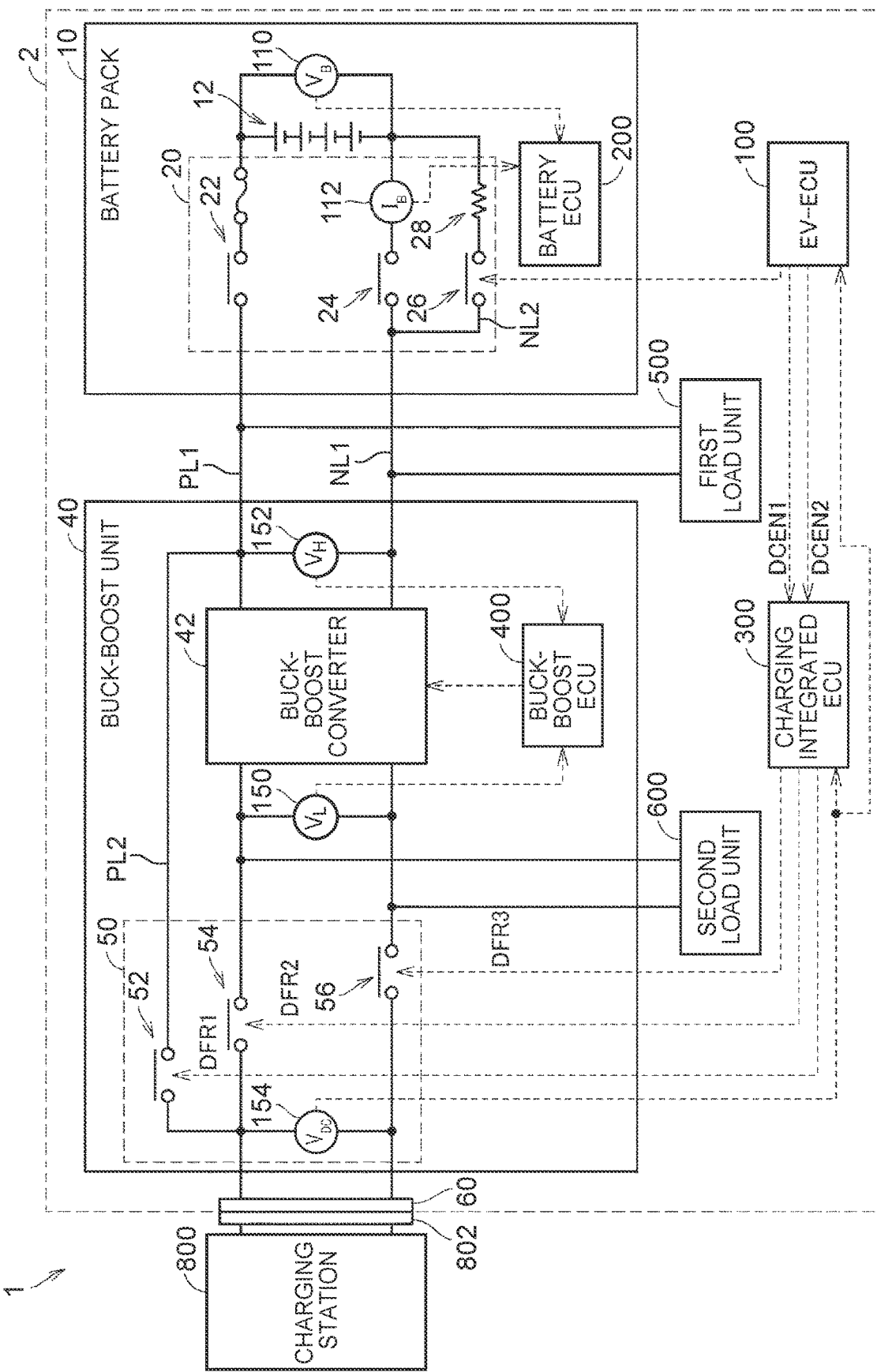
FIG. 4 schematically shows an example of a configuration of a vehicle according to a modification.

FIG. 4 schematically shows an example of a configuration of the vehicle 2 according to a modification. The charging integrated ECU 300 shown in FIG. 4 is different from the charging integrated ECU 300 shown in FIG. 1 in that the detection result from the third voltage sensor 154 is output not only to the charging integrated ECU 300 but also to the EV-ECU 100. The configuration is otherwise similar to the configuration of the vehicle 2 shown in FIG. 1 except for the case described below. Therefore, detailed description thereof will not be repeated.

As shown in FIG. 4, in this modification, the third voltage sensor 154 is configured to output a signal indicating the detected voltage VDC to each of the charging integrated ECU 300 and the EV-ECU 100. The charging integrated ECU 300 may output the voltage VDC acquired from the third voltage sensor 154 to the EV-ECU 100.

Figure 5:
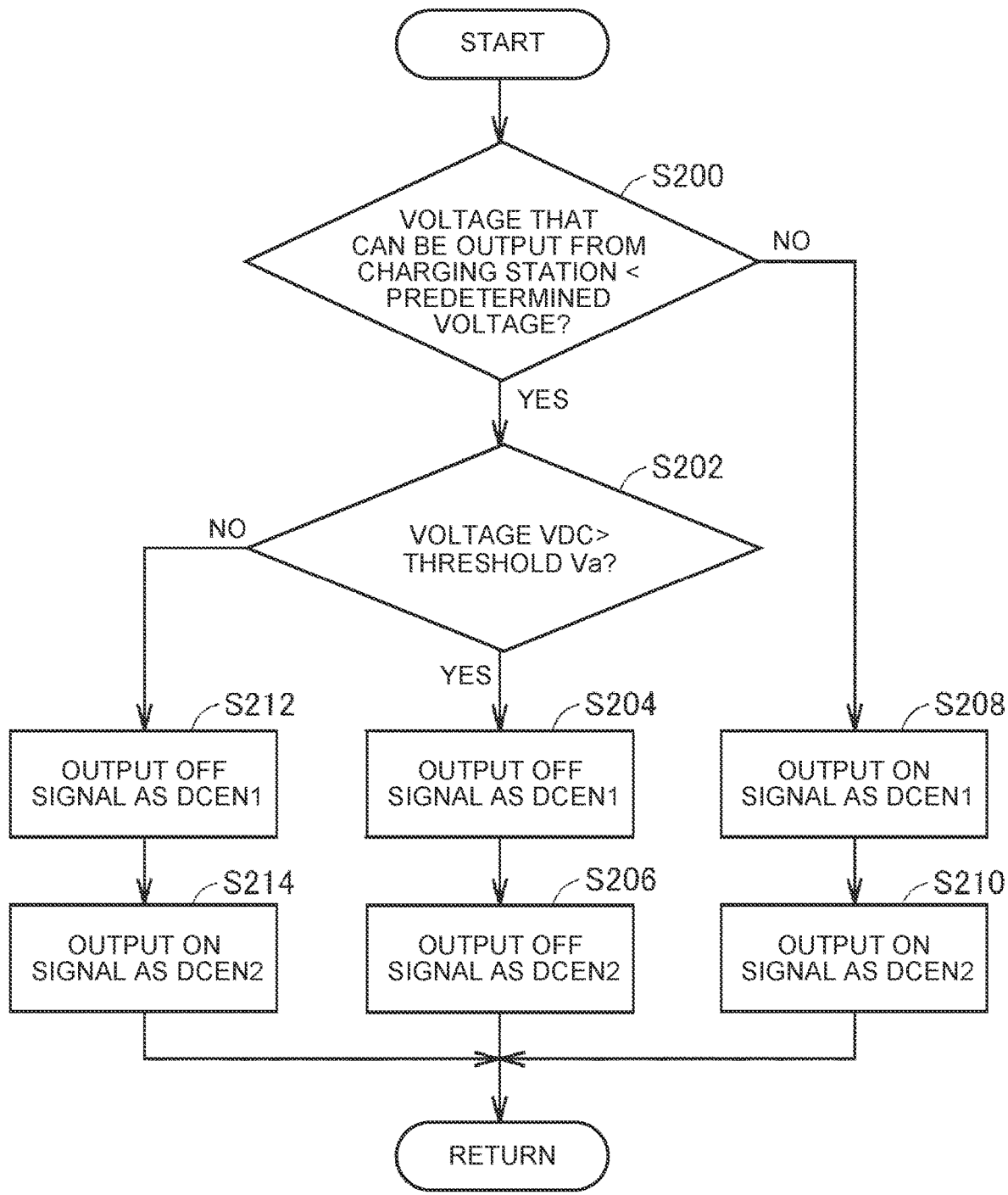
FIG. 5 is a flowchart showing an example of a process that is performed by an EV-ECU according to the modification.

Hereinafter, an example of a process that is performed by the EV-ECU 100 will be described with reference to FIG. 5. FIG. 5 is a flowchart showing an example of a process that is performed by the EV-ECU 100 according to the modification. A series of steps shown in the flowchart is repeatedly performed by the EV-ECU 100 in predetermined control cycles.

In S200, the EV-ECU 100 determines whether the voltage that can be output from the charging station 800 is lower than a predetermined voltage. Since the method for determining whether the voltage that can be output from the charging station 800 is lower than the predetermined voltage is as described above, detailed description thereof will not be repeated. When it is determined that the voltage that can be output from the charging station 800 is lower than the predetermined voltage (YES in S200), the process proceeds to S202.

In S202, the EV-ECU 100 determines whether the voltage VDC detected by the third voltage sensor 154 is higher than a threshold Va. The threshold Va is herein described as the same value as the predetermined voltage. However, the threshold Va may be any value as long as it can be determined that the voltage on the inlet 60 side is higher than at least the output voltage of the charging station 800. The threshold Va is not particularly limited to the same value as the predetermined voltage. When it is determined that the voltage VDC is higher than the threshold Va (YES in S202), the process proceeds to S204.

In S204, the EV-ECU 100 outputs an OFF signal as the permission-prohibition signal DCEN1. The process then proceeds to S206.

In S206, the EV-ECU 100 outputs an OFF signal as the permission-prohibition signal DCEN2. The process then ends.

In S208, the EV-ECU 100 outputs an ON signal as the permission-prohibition signal DCEN1. The process then proceeds to S210.

In S210, the EV-ECU 100 outputs an ON signal as the permission-prohibition signal DCEN2. The process then ends. When it is determined that the voltage VDC is equal to or lower than the threshold Va (NO in S202), the process proceeds to S212.

In S212, the EV-ECU 100 outputs an OFF signal as the permission-prohibition signal DCEN1. The process then proceeds to S214.

In S214, the EV-ECU 100 outputs an ON signal as the permission-prohibition signal DCEN2. The process then ends.

An example of the operation of the EV-ECU 100 and the charging integrated ECU 300 according to this modification based on the above structure and flowchart will be described.

For example, it is herein assumed that the connector 802 of the charging station 800 is attached to the inlet 60 of the vehicle 2 in a stopped state. It is also assumed that the voltage that can be output from the charging station 800 is lower than the predetermined voltage.

When the connector 802 of the charging station 800 is attached to the inlet 60, information on charging power is acquired from the charging station 800, and it is determined whether the voltage that can be output from the charging station 800 as included in the acquired information is lower than the predetermined voltage (S200).

When the voltage that can be output from the charging station 800 is lower than the predetermined voltage (YES in S200) and the voltage VDC is equal to or lower than the threshold Va (NO in S202), an OFF signal is output to the charging integrated ECU 300 as the permission-prohibition signal DCEN1 (S212), and an ON signal is output to the charging integrated ECU 300 as the permission-prohibition signal DCEN2 (S214).

Therefore, an OFF signal is output from the first AND circuit 304 to the first relay 52 as the drive signal DFR1, an ON signal is output from the second AND circuit 306 to the second relay 54 as the drive signal DFR2, and an ON signal is output from the third AND circuit 308 to the third relay 56 as the drive signal DFR3. At this time, the second positive electrode line PL2 is electrically disconnected, and the first positive electrode line PL1 is electrically connected. Therefore, the power from the charging station 800 is supplied to the energy storage device 12 via the buck-boost converter 42.

An OFF signal is input from the EV-ECU 100 to the first AND circuit 304 as the permission-prohibition signal DCEN1. Therefore, even when an ON signal is input to the first AND circuit 304 as the first command due to an abnormality in the microcomputer 302, an OFF signal is output from the first AND circuit 304 as the drive signal DFR1. Therefore, the first relay 52 is less likely to be electrically connected.

On the other hand, when an abnormality occurs such as the first relay 52 being fixed to the ON state or the voltage of the energy storage device 12 being supplied to the inlet 60 due to an abnormality in the buck-boost converter 42, and the voltage VDC becomes higher than the threshold Va due to such an abnormality (YES in S202), an OFF signal is output as the permission-prohibition signal DCEN1, and an OFF signal is output as the permission-prohibition signal DCEN2.

As a result, even when an ON signal is output as the second command and the third command, an OFF signal is output from the first AND circuit 304 to the first relay 52 as the drive signal DFR1, an OFF signal is output from the second AND circuit 306 to the second relay 54 as the drive signal DFR2, and an OFF signal is output from the third AND circuit 308 to the third relay 56 as the drive signal DFR3. At this time, all of the first positive electrode line PL1, the second positive electrode line PL2, and the first negative electrode line NL1 are electrically disconnected. A current can therefore be restrained from flowing from the energy storage device 12 to the charging station 800.

In the above embodiment, the configuration in which one relay is provided on the second positive electrode line PL2 is described as an example. However, two relays may be provided on the second positive electrode line PL2.

Figure 6:
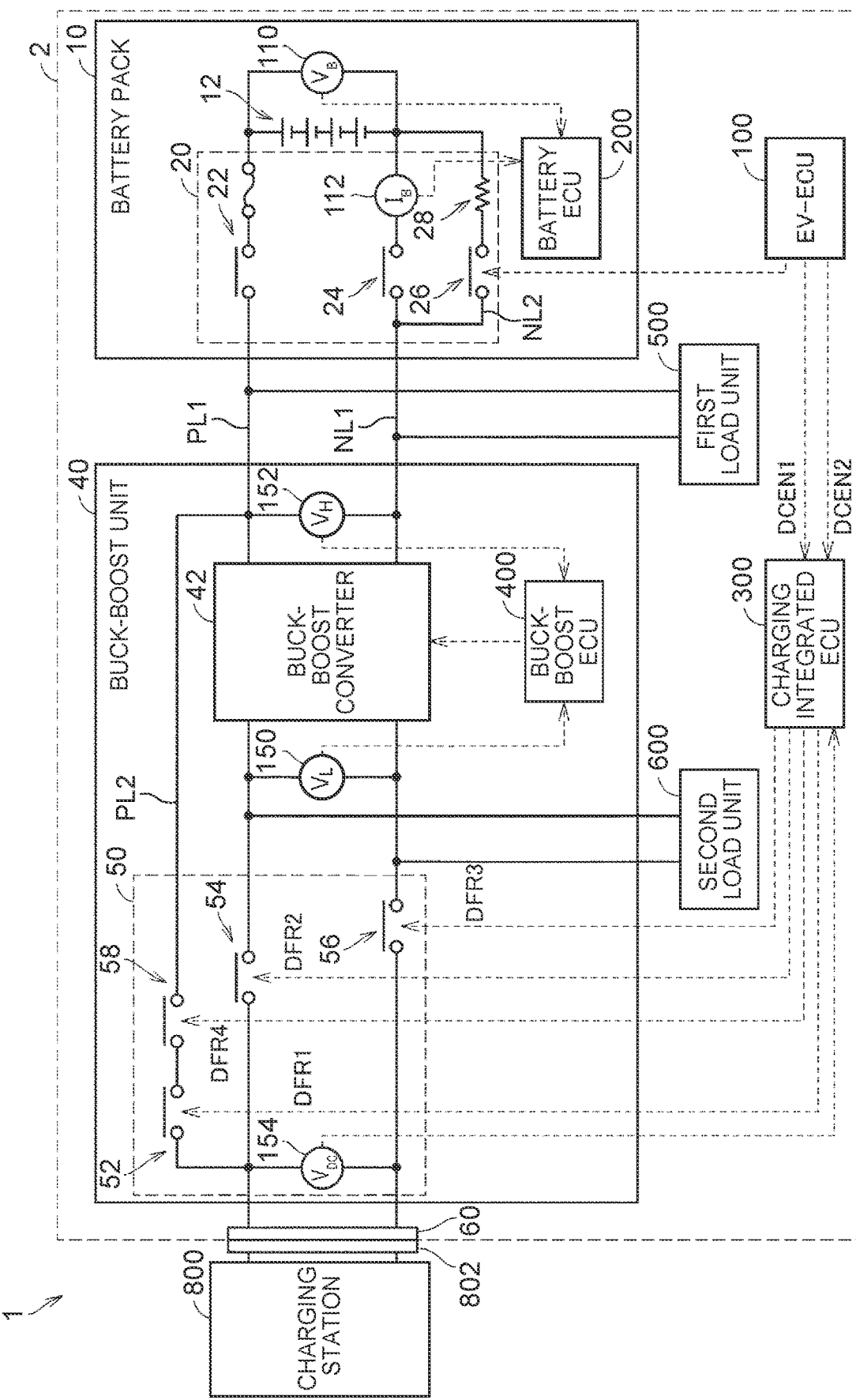
FIG. 6 schematically shows an example of a configuration of a vehicle according to another modification.

FIG. 6 schematically shows an example of a configuration of the vehicle 2 according to another modification. The vehicle 2 shown in FIG. 6 is different from the vehicle 2 shown in FIG. 1 in that a fourth relay 58 is further provided on the second positive electrode line PL2, in addition to the first relay 52. The configuration is otherwise similar to the configuration of the vehicle 2 shown in FIG. 1 except for the case described below. Therefore, detailed description thereof will not be repeated.

As shown in FIG. 6, in this modification, the first relay 52 and the fourth relay 58 that are connected in series with each other are provided on the second positive electrode line PL2. For example, the charging integrated ECU 300 may be configured to output the drive signal DFR1 from the first AND circuit 306 to the first relay 52 and output a drive signal DFR4 from the first AND circuit 306 to the fourth relay 58. Alternatively, the charging integrated ECU 300 may further include a fourth AND circuit (not shown) that outputs a logical conjunction of the permission-prohibition signal DCEN1 and the first command from the microcomputer 302, and may be configured to output the drive signal DFR4 from the fourth AND circuit to the fourth relay 58.

With this configuration, even when an ON signal is unintentionally output as the first command due to an abnormality in the microcomputer 302 as described above, the electrically disconnected state of the first relay 52 and the fourth relay 58 can be maintained as the permission-prohibition signal DCEN1 is an OFF signal. Moreover, even when one of the two relays, the first relay 52 and the fourth relay 58, is fixed to the ON state, the second positive electrode line PL2 can be electrically disconnected using the relay that is not fixed to the ON state.

Furthermore, for example, the fixed state of at least one of the four relays, the first relay 52, the second relay 54, the third relay 56, and the fourth relay 58, can be detected by switching the first relay 52, the second relay 54, the third relay 56, and the fourth relay 58 between the electrically connected state (the first electrically connected state, a second electrically connected state, a third electrically connected state, and a fourth electrically connected state) and the electrically disconnected state (the first electrically disconnected state, a second electrically disconnected state, a third electrically disconnected state, and a fourth electrically disconnected state) after charging is completed.

Figure 7:
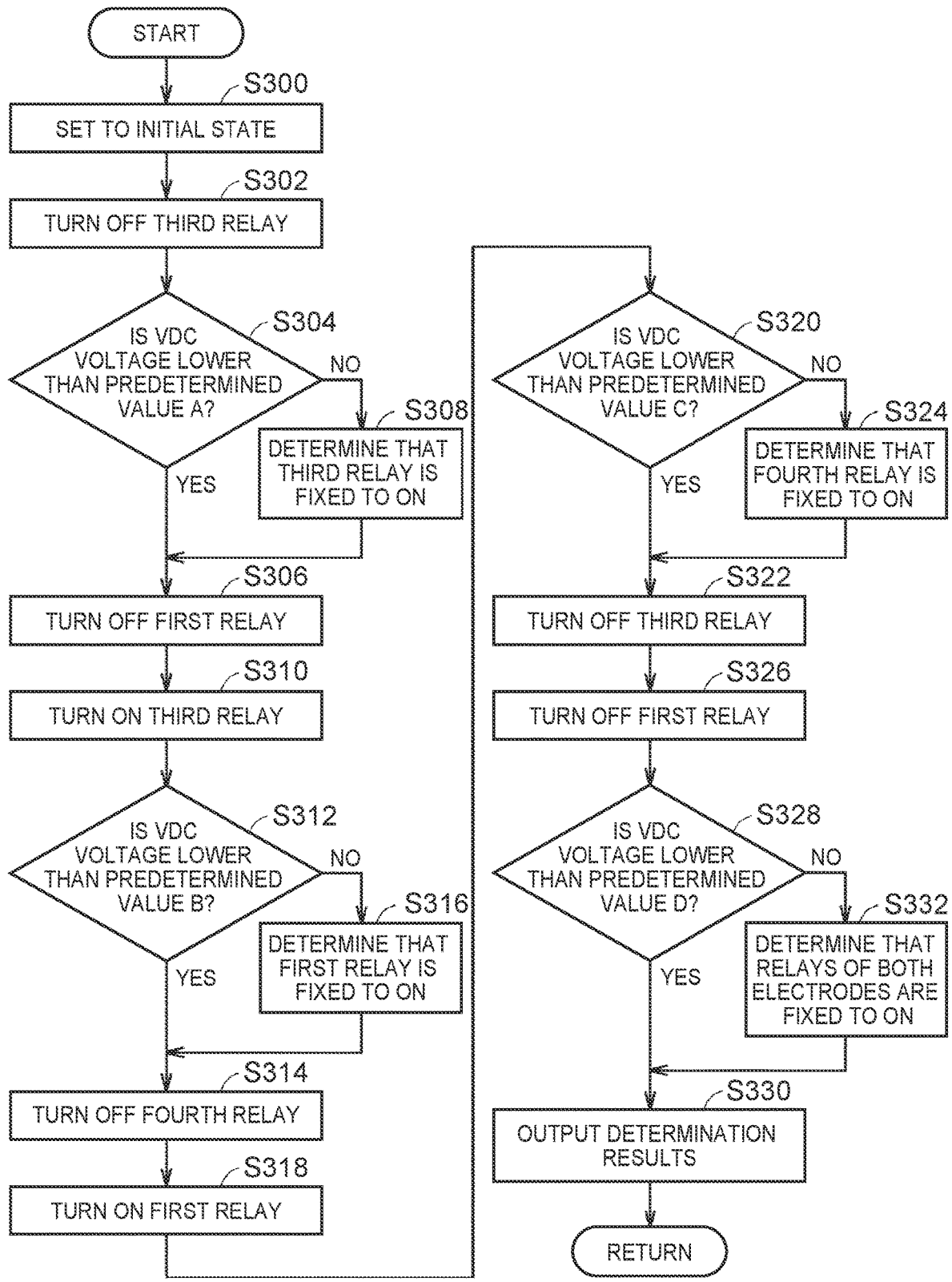
FIG. 7 is a flowchart showing an example of a process that is performed by a microcomputer of a charging integrated ECU according to the other modification.

FIG. 7 is a flowchart showing an example of a process that is performed by the microcomputer 302 of the charging integrated ECU 300 according to this modification. A series of steps shown in this flowchart is performed by the microcomputer 302 when an execution condition such as after charging is satisfied. For convenience of explanation, it is herein assumed that the EV-ECU 100 outputs an ON signal as the permission-prohibition signal DCEN1 and the permission-prohibition signal DCEN2.

In S300, the microcomputer 302 sets the first relay 52, the second relay 54, the third relay 56, and the fourth relay 58 to their initial state. That is, the microcomputer 302 outputs an ON signal as the first command, the third command, and the fourth command, and outputs an OFF signal as the second command.

In S302, the microcomputer 302 sets the third relay 56 to the OFF state. That is, the microcomputer 302 outputs an OFF signal as the third command.

In S304, the microcomputer 302 determines whether the voltage VDC is lower than a predetermined value A. The predetermined value A is, for example, a predetermined value that is lower than the voltage of the energy storage device 12. When it is determined that the voltage VDC is lower than the predetermined value A (YES in S304), the process proceeds to S306.

In S306, the microcomputer 302 sets the first relay 52 to the OFF state. That is, the microcomputer 302 outputs an OFF signal as the first command. The process then proceeds to S310. When it is determined that the voltage VDC is not lower than the predetermined value A (NO in S304), the process proceeds to S308.

In S308, the microcomputer 302 determines that the third relay 56 is fixed to the ON state. The microcomputer 302 sets, for example, a failure determination flag indicating that the third relay 56 is fixed to the ON state. The process then proceeds to S306.

In S310, the microcomputer 302 sets the third relay 56 to the ON state. The process then proceeds to S312.

In S312, the microcomputer 302 determines whether the voltage VDC is lower than a predetermined value B. The predetermined value B is, for example, a predetermined value that is lower than the voltage of the energy storage device 12. The predetermined value B may be the same value as the predetermined value A, or may be a different value from the predetermined value A. When it is determined that the voltage VDC is lower than the predetermined value B (YES in S312), the process proceeds to S314.

In S314, the microcomputer 302 sets the fourth relay 58 to the OFF state. That is, the microcomputer 302 outputs an OFF signal as the fourth command. The process then proceeds to S318. When it is determined that the voltage VDC is not lower than the predetermined value B (NO in S312), the process proceeds to S316.

In S316, the microcomputer 302 determines that the first relay 52 is fixed to the ON state. The microcomputer 302 sets, for example, a failure determination flag indicating that the first relay 52 is fixed to the ON state. The process then proceeds to S314.

In S318, the microcomputer 302 sets the first relay 52 to the ON state. The process then proceeds to S320.

In S320, the microcomputer 302 determines whether the voltage VDC is lower than a predetermined value C. The predetermined value C is, for example, a predetermined value that is lower than the voltage of the energy storage device 12. The predetermined value C may be the same value as either or both of the predetermined value A and the predetermined value B, or may be a different value from both the predetermined value A and the predetermined value B. When it is determined that the voltage VDC is lower than the predetermined value C (YES in S320), the process proceeds to S322.

In S322, the microcomputer 302 sets the third relay 56 to the OFF state. The process then proceeds to S326. When it is determined that the voltage VDC is not lower than the predetermined value C (NO in S320), the process proceeds to S324.

In S324, the microcomputer 302 determines that the fourth relay 58 is fixed to the ON state. The microcomputer 302 sets, for example, a failure determination flag indicating that the fourth relay 58 is fixed to the ON state. The process then proceeds to S322.

In S326, the microcomputer 302 sets the first relay 52 to the OFF state. The process then proceeds to S328.

In S328, the microcomputer 302 determines whether the voltage VDC is lower than a predetermined value D. The predetermined value D is, for example, a predetermined value that is lower than the voltage of the energy storage device 12. The predetermined value D may be the same value as at least one of the three predetermined values, the predetermined value A, the predetermined value B, and the predetermined value C, or may be a different value from all of the predetermined value A, the predetermined value B, and the predetermined value C. When it is determined that the voltage VDC is lower than the predetermined value D (YES in S328), the process proceeds to S330.

In S330, the microcomputer 302 outputs the determination results. For example, the microcomputer 302 may output the determination results, such as information indicating that repair is necessary and information on a failure location based on the states of the various failure determination flags, to a display device etc. When it is determined that the voltage VDC is not lower than the predetermined value D (NO in S328), the process proceeds to S332.

In S332, the microcomputer 302 determines that the first relay 52 and the third relay 56 of both electrodes are fixed to the ON state. The process then proceeds to S330.

The operation of the charging integrated ECU 300 according to this modification based on the above structure and flowchart will be described.

For example, it is herein assumed that charging of the energy storage device 12 is completed. At this time, the third relay 56 is set to the OFF state (S302) after being set to its initial state (S300). When the voltage VDC is not lower than the predetermined value A (NO in S304), it is determined that the third relay 56 is fixed to the ON state (S308).

Thereafter, or when it is determined that the voltage VDC is lower than the predetermined value A (YES in S304), the first relay 52 is set to the OFF state (S306), and the third relay 56 is set to the ON state (S310). When it is determined that the voltage VDC is not lower than the predetermined value B (NO in S312), it is determined that the first relay 52 is fixed to the ON state (S316).

Thereafter, or when it is determined that the voltage VDC is lower than the predetermined value B (YES in S312), the fourth relay 58 is set to the OFF state (S314), and the first relay 52 is set to the ON state (S318).

When the voltage VDC is not lower than the predetermined value C (NO in S320), it is determined that the fourth relay 58 is fixed to the ON state (S324).

Thereafter, or when it is determined that the voltage VDC is lower than the predetermined value C (YES in S320), the third relay 56 is set to the OFF state (S322), and the first relay 52 is set to the OFF state (S326).

At this time, when the voltage VDC is not lower than the predetermined value D (NO in S328), it is determined that both the first relay 52 and the third relay 56 are fixed to the ON state (S332).

Thereafter, or when the voltage VDC is lower than the predetermined value D (YES in S328), the determination results are output (S330).

In this way, whether each relay is fixed to the ON state can be accurately determined.

In the above embodiment, it is described that the permission-prohibition signals DCEN1, DCEN2 generated in the EV-ECU 100 are output to the charging integrated ECU 300. However, for example, the permission-prohibition signals DCEN1, DCEN2 may be generated in a control device 804 (FIG. 1) included in the charging station 800, and the generated permission-prohibition signals DCEN1, DCEN2 may be input to the charging integrated ECU 300. In some embodiments, in the case where the permission-prohibition signals DCEN1, DCEN2 generated in the EV-ECU 100 are output to the charging integrated ECU 300, the control device 804 may not be provided in the charging station 800.

The above modifications may be wholly or partially combined as appropriate. The embodiment disclosed herein should be considered as illustrative, not restrictive, in all respects. The scope of the present disclosure is defined by the claims rather than by the above description, and is intended to include all modifications that fall within the meaning and scope equivalent to those of the claims.

What is claimed is:

1. A vehicle comprising:
   an inlet configured to be connected to an external power supply outside the vehicle;
   a power conversion device configured to be connected to the inlet;
   an energy storage device configured to be charged with power supplied via the inlet;
   a first power line configured to connect the inlet and the energy storage device via the power conversion device;
   a second power line configured to connect the inlet and the energy storage device without via the power conversion device;
   a first relay configured to switch between a first electrically connected state in which the second power line is electrically connected and a first electrically disconnected state in which the second power line is electrically disconnected; and
   a first control device configured to control the first relay, wherein the first control device is configured to switch the first relay to the first electrically disconnected state when a voltage that is able to be supplied from the external power supply is lower than a voltage range in which the energy storage device is able to be charged.

2. The vehicle according to claim 1, further comprising a second control device different from the first control device, wherein the second control device is configured to acquire information on the voltage that is able to be supplied from the external power supply, and is configured to, when the voltage that is able to be supplied from the external power supply as included in the acquired information is lower than the voltage range, switch the first relay to the first electrically disconnected state regardless of a command for the first relay generated in the first control device.

3. The vehicle according to claim 1, further comprising a second relay configured to switch between a second electrically connected state in which the first power line is electrically connected and a second electrically disconnected state in which the first power line is electrically disconnected, wherein the first control device is configured to switch the first relay to the first electrically connected state and switch the second relay to the second electrically disconnected state when the voltage that is able to be supplied from the external power supply is within the voltage range.

4. The vehicle according to claim 2, further comprising a second relay configured to switch between a second electrically connected state in which the first power line is electrically connected and a second electrically disconnected state in which the first power line is electrically disconnected, wherein the first control device is configured to switch the first relay to the first electrically connected state and switch the second relay to the second electrically disconnected state when the voltage that is able to be supplied from the external power supply is within the voltage range.

5. The vehicle according to claim 3, further comprising a detection device that detects a voltage at the inlet, wherein the first control device is configured to switch the first relay to the first electrically disconnected state and the second relay to the second electrically disconnected state when the voltage that is able to be supplied from the external power supply is lower than the voltage range and the voltage at the inlet is higher than a threshold.

6. The vehicle according to claim 4, further comprising a detection device that detects a voltage at the inlet, wherein the second control device is configured to, when the voltage that is able to be supplied from the external power supply is lower than the voltage range and the voltage at the inlet is higher than a threshold, switch the first relay to the first electrically disconnected state and the second relay to the second electrically disconnected state regardless of a command for the first relay and the second relay generated in the first control device.

7. A vehicle control device mounted on a vehicle, the vehicle including
   an inlet configured to be connected to an external power supply outside the vehicle,
   a power conversion device configured to be connected to the inlet,
   an energy storage device configured to be charged with power supplied via the inlet,
   a first power line configured to connect the inlet and the energy storage device via the power conversion device,
   a second power line configured to connect the inlet and the energy storage device without via the power conversion device, and
   a first relay configured to switch between a first electrically connected state in which the second power line is electrically connected and a first electrically disconnected state in which the second power line is electrically disconnected,
the vehicle control device comprising:
   an acquisition unit configured to acquire a voltage that is able to be supplied from the external power supply; and
   a control unit configured to control the first relay in such a manner that the first relay switches to the first electrically disconnected state when the voltage that is able to be supplied from the external power supply is lower than a voltage range in which the energy storage device is able to be charged.

8. A charging system comprising:
a vehicle; and
an external power supply outside the vehicle, wherein:
the vehicle includes
   an inlet configured to be connected to the external power supply,
   a power conversion device configured to be connected to the inlet,
   an energy storage device configured to be charged with power supplied via the inlet,
   a first power line configured to connect the inlet and the energy storage device via the power conversion device,
   a second power line configured to connect the inlet and the energy storage device without via the power conversion device, and
   a first relay configured to switch between a first electrically connected state in which the second power line is electrically connected and a first electrically disconnected state in which the second power line is electrically disconnected;
the external power supply includes a control device configured to control the first relay; and
the control device is configured to switch the first relay to the first electrically disconnected state when a voltage that is able to be supplied from the external power supply is lower than a voltage range in which the energy storage device is able to be charged.

* * * * *